(12) United States Patent
Shirai (10) Patent No.: US 8,687,122 B2
(45) Date of Patent: Apr. 1, 2014

(54) IMAGE DISPLAY DEVICE

(71) Applicant: SANYO Electric Co., Ltd., Moriguchi (JP)

(72) Inventor: Kazuyuki Shirai, Shijyounawate (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 0 days.

(21) Appl. No.: 13/772,767

(22) Filed: Feb. 21, 2013

(65) Prior Publication Data

US 2013/0162647 A1   Jun. 27, 2013

Related U.S. Application Data

(63) Continuation of application No. 12/787,061, filed on May 25, 2010, now Pat. No. 8,411,204.

(30) Foreign Application Priority Data

May 26, 2009  (JP) .................................. 2009-126537

(51) Int. Cl.
| | |
|---|---|
| *H04N 5/57* | (2006.01) |
| *H04N 5/58* | (2006.01) |
| *H04N 5/00* | (2011.01) |
| *H04N 5/45* | (2011.01) |
| *H04N 5/14* | (2006.01) |
| *H04N 7/04* | (2006.01) |
| *H04N 5/76* | (2006.01) |
| *H04N 5/222* | (2006.01) |
| *G03B 13/00* | (2006.01) |
| *G06T 17/00* | (2006.01) |

(52) U.S. Cl.
USPC .......... 348/602; 348/607; 348/656; 348/571; 348/687; 348/469; 348/231.99; 348/333.01; 396/567; 345/428

(58) Field of Classification Search
None
See application file for complete search history.

(56) References Cited

U.S. PATENT DOCUMENTS

| | | | |
|---|---|---|---|
| 6,739,767 B2 | 5/2004 | Ikeda et al. | |
| 2001/0043277 A1 | 11/2001 | Tanaka et al. | |
| 2003/0174216 A1 | 9/2003 | Iguchi et al. | |
| 2004/0212692 A1 | 10/2004 | Nakami et al. | |

(Continued)

FOREIGN PATENT DOCUMENTS

| | | | |
|---|---|---|---|
| JP | 04078066 A | 3/1992 | |
| JP | 2003-339057 A | 11/2003 | |

(Continued)

OTHER PUBLICATIONS

Japanese Office Action dated Dec. 18, 2012, issued in corresponding Japanese patent application No. 2009-126537, w/ English translation.

*Primary Examiner* — Jefferey Harold
*Assistant Examiner* — Sean Haiem
(74) *Attorney, Agent, or Firm* — Westerman, Hattori, Daniels & Adrian, LLP (57) ABSTRACT

According to the present invention, there is provided an image display device for displaying acquired image information including: an information acquisition section for acquiring image information and information associated with the image information by communication from an external device; an adjustment section for executing image quality adjustment processing in relation to display of the image information; and a setting section for setting details of the image quality adjustment processing, based on the information. Therefore, details of the image quality adjustment processing may easily be set automatically in an appropriate manner.

2 Claims, 5 Drawing Sheets

(56) References Cited

U.S. PATENT DOCUMENTS

| | | |
|---|---|---|
| 2008/0180551 A1 | 7/2008 | Koike |
| 2009/0033646 A1 | 2/2009 | Liu et al. |
| 2009/0091654 A1 | 4/2009 | Nakamura et al. |
| 2009/0290042 A1 | 11/2009 | Shiohara |
| 2010/0157154 A1 | 6/2010 | Kobayashi et al. |

FOREIGN PATENT DOCUMENTS

| | | |
|---|---|---|
| JP | 2006-121461 A | 5/2006 |
| JP | 2006-287743 A | 10/2006 |
| JP | 2007141563 A | 6/2007 |
| JP | 2008193605 A | 8/2008 |
| JP | 2008-206179 A | 9/2008 |
| JP | 2009-37211 A | 2/2009 |
| JP | 2009-38682 A | 2/2009 |

<Exif INFORMATION>

ISO SPEED
IMAGING LIGHT SOURCE
SHOOTING DATE AND TIME
FILE NAME
CAMERA MANUFACTURER
CAMERA MODEL
FOCAL LENGTH
DIAPHRAGM
LENS APERTURE VALUE
IMAGE TAKING MODE
APPLIED LENS
FOCUS MODE

FIG.5

| ISO SPEED | NOISE REDUCTION AMOUNT ||
|---|---|---|
| | MOVING IMAGE | STILL IMAGE |
| 50 | Min ||
| 100 | Max × 100/3200 | Max × 0.5 × 100/3200 |
| 200 | Max × 200/3200 | Max × 0.5 × 200/3200 |
| 400 | Max × 400/3200 | Max × 0.5 × 400/3200 |
| 800 | Max × 800/3200 | Max × 0.5 × 800/3200 |
| 1600 | Max × 1600/3200 | Max × 0.5 × 1600/3200 |
| 3200 | Max | Max × 0.5 |

FIG.6

| TYPE OF LIGHT SOURCE | COLOR TEMPERATURE |
|---|---|
| DAYLIGHT | 6000K |
| CLOUDY | 6500K |
| WHITE FLUORESCENT LAMP | 4500K |
| INCANDESCENT LAMP (TUNGSTEN) | 3000K |
| STANDARD LIGHT A | 2865K |
| STANDARD LIGHT B | 4874K |
| STANDARD LIGHT C | 6774K |
| D65 | 6500K |

IMAGE DISPLAY DEVICE

CROSS-REFERENCE TO RELATED APPLICATIONS

The present application is a continuation of U.S. application Ser. No. 12/787,061 filed on May 25, 2010, which claims priority from Japanese Patent Application No. 2009-126537 filed on May 26, 2009, the content of which are hereby entirely incorporated by reference into this application.

BACKGROUND OF THE INVENTION

1. Field of the Invention

The present invention relates to an image display de vice provided with a function of adjusting image quality.

2. Description of the Related Art

Conventionally, an image display device which is connectable to an external device such as a digital video camera and displays image information (information on a moving image or on a still image) transmitted from the external device is widely used.

The image display device as described above may also be additionally provided with a function of executing image quality adjustment processing, such as, a function of executing noise reduction processing for reducing noise in an image, or a function of executing processing of adjusting a white balance or a color temperature. Those functions thus provided may be useful for allowing a user to view a better image.

As described above, the noise reduction processing may be effective at reducing noise in an image. However, in the noise reduction processing, an original image is subjected to certain processing, and hence faithful reproduction of the original image may become difficult if the image is excessively subjected to the noise reduction processing. Accordingly, it is desirable that the switching of ON/OFF of the noise reduction processing, or a degree of correction (noise reduction amount) in the processing be determined based on an amount of noise in the image.

Further, a desirable state (for example, a state that brings no feeling of strangeness to a viewer) of a white balance or a color temperature may vary depending on a light source used for taking the image and a type of a light source used in a viewing environment of the image. Accordingly, in the processing of adjusting the white balance or the color temperature, it is desirable that a target value (how the adjustment is to be made) be appropriately set depending on the type of the light source (imaging light source) used for taking the image and the type of the light source (viewing light source) used in the viewing environment of the image.

It should be noted that the user may find it inconvenient if the user is required to set details of the image quality adjustment processing (such as the switching of ON/OFF and the setting of a target value) as described above. Accordingly, those settings may desirably be made automatically in the image display device.

SUMMARY OF THE INVENTION

According to the present invention, there is provided an image display device for displaying acquired image information including: an information acquisition section for acquiring image information and information associated with the image information by communication from an external device; an adjustment section for executing image quality adjustment processing in relation to display of the image information; and a setting section for setting details of the image quality adjustment processing, based on the information.

DESCRIPTION OF THE DRAWINGS

Features of the present invention may become more apparent from the following description of the preferred embodiment is with reference to the accompanying drawings illustrating the following matters.

In the accompanying drawings.

DESCRIPTION OF THE PREFERRED EMBODIMENTS

An embodiment of the present invention is described below, by taking, as an example, an image display device for displaying an image based on an image signal input thereto.

Figure 1:
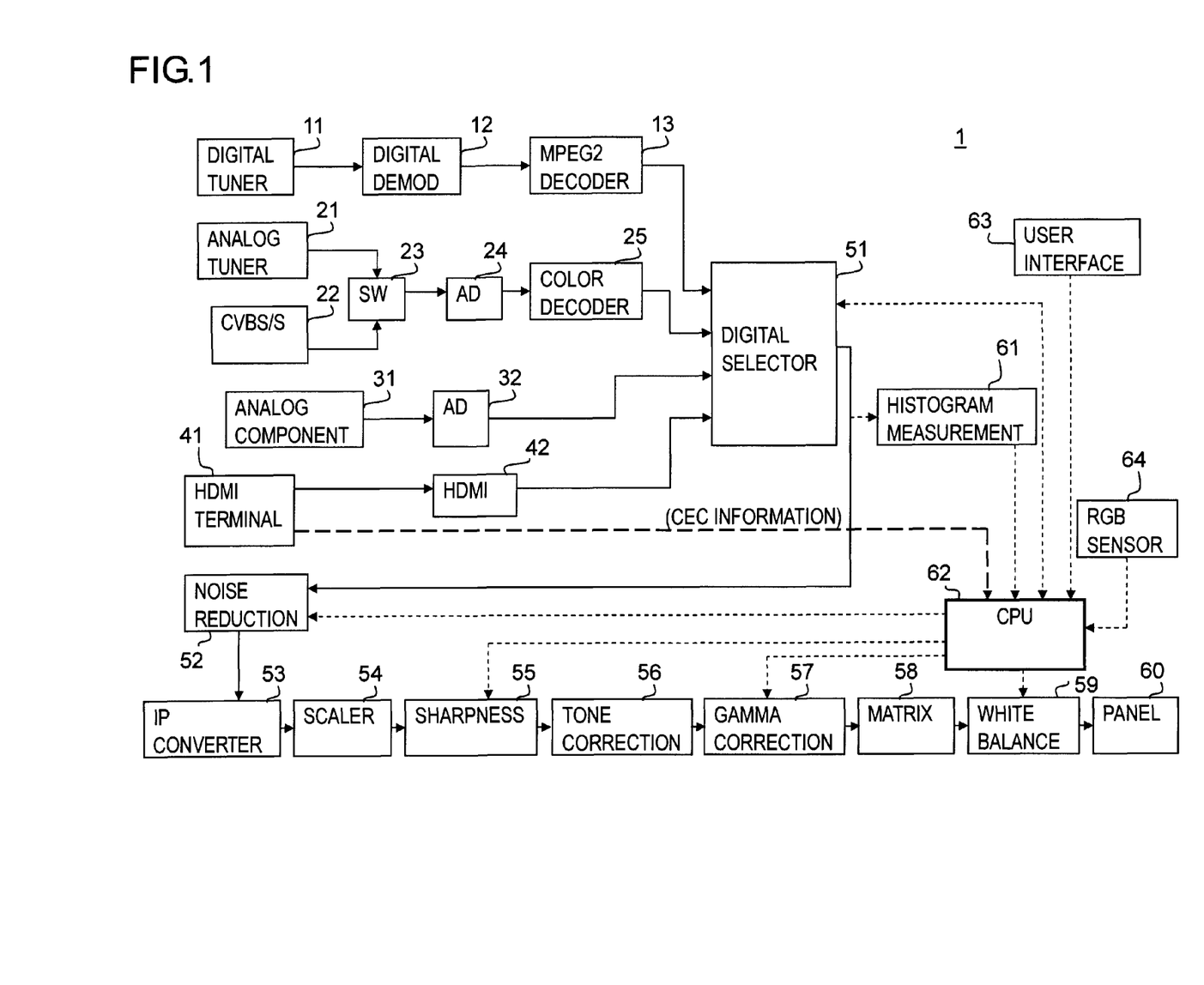
FIG. 1 is a configuration diagram of an image display device according to an embodiment of the present invention.

A detailed configuration of an image display device 1 is described with reference to FIG. 1. As illustrated in FIG. 1, the image display device 1 includes a digital tuner 11, a digital signal demodulation circuit 12, a motion picture experts group (MPEG)-2 decoder 13, an analog tuner 21, a composite video baseband (CUBS)/S signal reception section 22, a selector switch 23, an analog-to-digital (AD) converter 24, a color decoder 25, an analog component signal input section 31, an AD converter 32, a high-definition multimedia interface (HDMI) terminal 41, an HDMI signal reception section 42, a digital selector 51, a noise reduction section 52, an interlace/progressive (IP) converter 53, a scaler 54, a sharpness processing section 55, an image quality adjustment section 56, a gamma correction section 57, a matrix section 58, a white balance adjustment section 59, a panel 60, a histogram measurement section 61, a central processing unit (CPU) 62, a user interface 63, and a red, green, blue (RGB) sensor 64.

The digital tuner 11 receives an input of image signals of terrestrial digital broadcasting, broadcast satellite (BS) digital broadcasting, or communication satellite (CS) digital broadcasting, which are received by an antenna disposed in a preceding stage. Then, a signal of a predetermined channel is selected from the image signals thus input, and the selected signal is output to a subsequent stage. It should be noted that the image signals have been subjected to compression processing by MPEG-2 and to predetermined modulation processing.

The digital signal demodulation circuit 12 subjects the image signal (modulated signal) transmitted from the digital tuner 11 side, to demodulation processing. Further, the MPEG-2 decoder 13 decompresses the MPEG-2 compressed image signal transmitted from the digital signal demodulation circuit 12.

The analog tuner 21 receives an input of image signals of terrestrial analog broadcasting received by the antenna disposed in the preceding stage, and subjects the signals thus input to channel tuning processing. Meanwhile, the CVBS/S signal input section 22 receives an image signal of CVBS/S externally input thereto. Further, the selector switch 23 connects one of the analog tuner 21 and the CVBS/S signal input section 22, to the AD converter 24 on the subsequent stage side, in a switchable manner. The switching is controlled by the CPU 62.

The color decoder 25 converts a signal of terrestrial analog broadcasting transmitted from the AD converter 24 or an image signal of CVBS/S, into a digital component signal including components of Y, Cb, and Cr.

The analog component signal input section 31 receives an analog component signal including components of Y, Cb, and Cr, which is externally input thereto. The analog component signal is converted into a digital component signal by the AD converter 32 on the subsequent stage side.

The HDMI terminal 41 is a terminal which enables connection to an external device (such as a digital video camera) via an HDMI cable. The image display device 1 is capable of performing communication (HDMI communication) conforming to the HDMI standard with the external device via the HDMI terminal 41, and may receive an image signal and consumer electronics control (CEC) information (such as CEC command) from the external device. It should be noted that, of the inputs to the HDMI terminal 41, the image signal is transmitted to the HDMI signal reception section 42 and the CEC information is transmitted to the CPU 62. Further, the HDMI signal reception section 42 converts the image signal transmitted thereto, into a digital component signal which includes components of Y, Cb, and Cr.

Meanwhile, the digital selector 51 is connected to each of the MPEG-2 decoder 13, the color decoder 25, the AD converter 32, and the HDMI signal reception section 42. Further, the digital selector 51 allows one of the MPEG-2 decoder 13, the color decoder 25, the AD converter 32, and the HDMI signal reception section 42 to be connected to a circuit on the subsequent stage side, so that an image signal may be transmitted to the subsequent stage side. It should be noted that the CPU 62 controls which one to be connected to the circuit on the subsequent stage side.

The noise reduction section 52 subjects an image signal transmitted from the digital selector 51 to noise reduction processing for reducing noise contained in the image signal. For example, the image signal may be corrected for smoothing out luminance variations among pixels in the image, to thereby implement the noise reduction processing. Further, in a case where the image signal is of a moving image, the noise reduction section 52 may make a correction on the image signal for reducing noise in a time axis direction.

It should be noted that, in the following description, the degree of correction in the noise reduction processing may be referred to as "noise reduction amount". When the noise reduction amount is increased, noise contained in the image signal may be suppressed more strongly, whereas the difference between the image obtained after the correction and the original image also becomes larger. In view of this, the noise reduction amount is desired to be set in just proportion to the amount of noise contained in the image signal.

The IP converter 53 performs an IP conversion process for converting an interlaced image signal transmitted from the noise reduction section 52 into a progressive image signal. It should be noted that the IP converter 53 does not perform any process in particular when the signal transmitted thereto is a progressive signal.

The scaler 54 converts the resolution of the image signal transmitted from the IP converter 53 into a resolution suited for the panel 60. Further, the sharpness processing section 55 executes sharpness processing for increasing sharpness on the image signal transmitted from the scaler 54. It should be noted that the sharpness processing itself is a known technology, which is implemented, for example, by correcting an image signal so that edge portions of the luminance signal in a lateral direction and a vertical direction may be enhanced.

The image quality adjustment section 56 makes adjustments to the image signal transmitted from the sharpness processing section 55, in terms of brightness, contrast, color, tint, and the like. It should be noted that processes of adjusting the white balance and the color temperature are executed by the white balance adjustment section 59, which is described later. Further, the gamma correction section 57 performs gamma correction with respect to the image signal transmitted from the image quality adjustment section 56.

The matrix section 58 converts the Y/Cb/Cr image signal transmitted from the gamma correction section 57 into an RGB (red, green, blue) image signal.

The white balance adjustment section 59 subjects the image signal transmitted from the matrix section 58 to the white balance adjustment processing. Further, the white balance adjustment section 59 also executes the color temperature adjustment processing in displaying the image signal on the panel 60. The white balance adjustment and the color temperature adjustment may be implemented by, for example, correcting the color tone of the image. An image signal output from the white balance adjustment section 59 is transmitted to the panel 60, and the image signal (image related to the image signal) is displayed.

Further, the histogram measurement section 61 measures a histogram in terms of luminance, for the image signal transmitted from the digital selector 51 to the noise reduction section 52. Information on the histogram is transmitted to the CPU 62.

The CPU 62 controls each section in the image display device 1 and executes various processings necessary for fulfilling the functions of the image display device 1. It should be noted that details of the main processings executed in the image display device 1 are later described again.

Further, the user interface 63 includes, for example, button switches, and receives various instructions from a user. With this configuration, the image display device 1 is capable of executing processing which reflects user's intention.

The RGB sensor 64 is provided to an external surface of the image display device 1. The RGB sensor 64 detects the intensity of received light for each color of red, green, and blue (RGB) (in other words, ambient brightness of the image display device 1 is detected for each of a plurality of colors), and transmits the detection result to the CPU 62. Accordingly, the CPU 62 is capable of estimating the type of the illumination around the image display device 1, that is, the type of the light source (viewing light source) used in an environment on the viewer's side.

With the configuration described above, the image display device 1 switches an input path for an image signal, through the control of the selector switch 23 and the digital selector 51. In other words, the image display device 1 connects any one of the digital tuner 11, the analog tuner 21, the CVBS/S signal reception section 22, the analog component signal input section 31, and the HDMI terminal 41, to the subsequent stage of the digital selector 51. Then, the image display device 1 receives an input of an image signal via the input path thus formed through the connection, and further, subjects the image signal thus input to predetermined processing, to thereby display the image corresponding to the image signal on the panel 60.

It should be noted that the input path for an image signal is switched when an input path switching instruction is given (when a predetermined operation of the user interface 63 is made) by the user, and the path is switched according to the instruction. Accordingly, the user may view an image corresponding to the image signal input over the desired input path.

Figure 2:
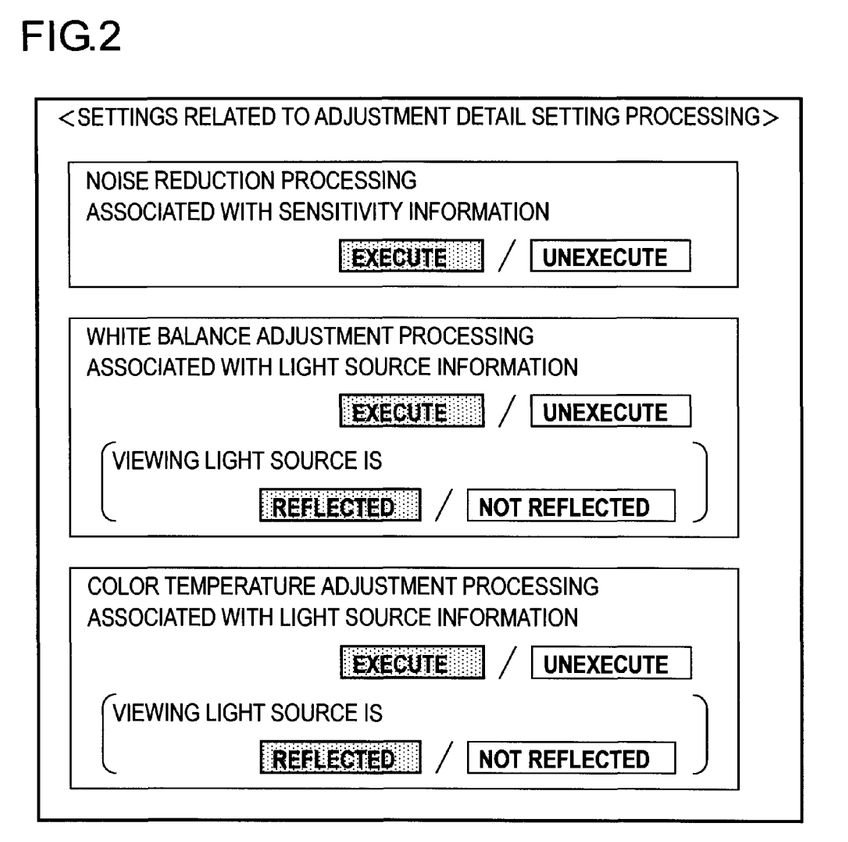
FIG. 2 is an explanatory diagram illustrating a menu screen which relates to adjustment detail setting processing.

Then, the image display device 1 executes processing of setting details of image quality adjustment (hereinafter, referred to as "adjustment detail setting processing") in relation to image display by a digital video camera (DVC), when the input path of an image signal is switched to a path which includes the HDMI terminal 41. Further, the image display device 1 displays a screen (hereinafter, also referred to as "menu screen") as illustrated in FIG. 2 by following an instruction of the user, and receives, as necessary, an instruction relating to the adjustment detail setting processing, from the user.

On the menu screen, the user may instruct whether to "execute" or to "unexecute" the noise reduction processing associated with sensitivity information. Further, the user may instruct whether to "execute" or to "unexecute" the white balance adjustment processing associated with light source information, and may further select, when "execute" is instructed, whether or not to have the viewing light source reflected in the processing. Still further, the user may instruct whether to "execute" or to "unexecute" the color temperature adjustment processing associated with the light source information, and may further select, when "execute" is instructed, whether or not to have the viewing light source reflected in the processing. How those instructions from the user are used may become apparent from the following description.

Figure 3:
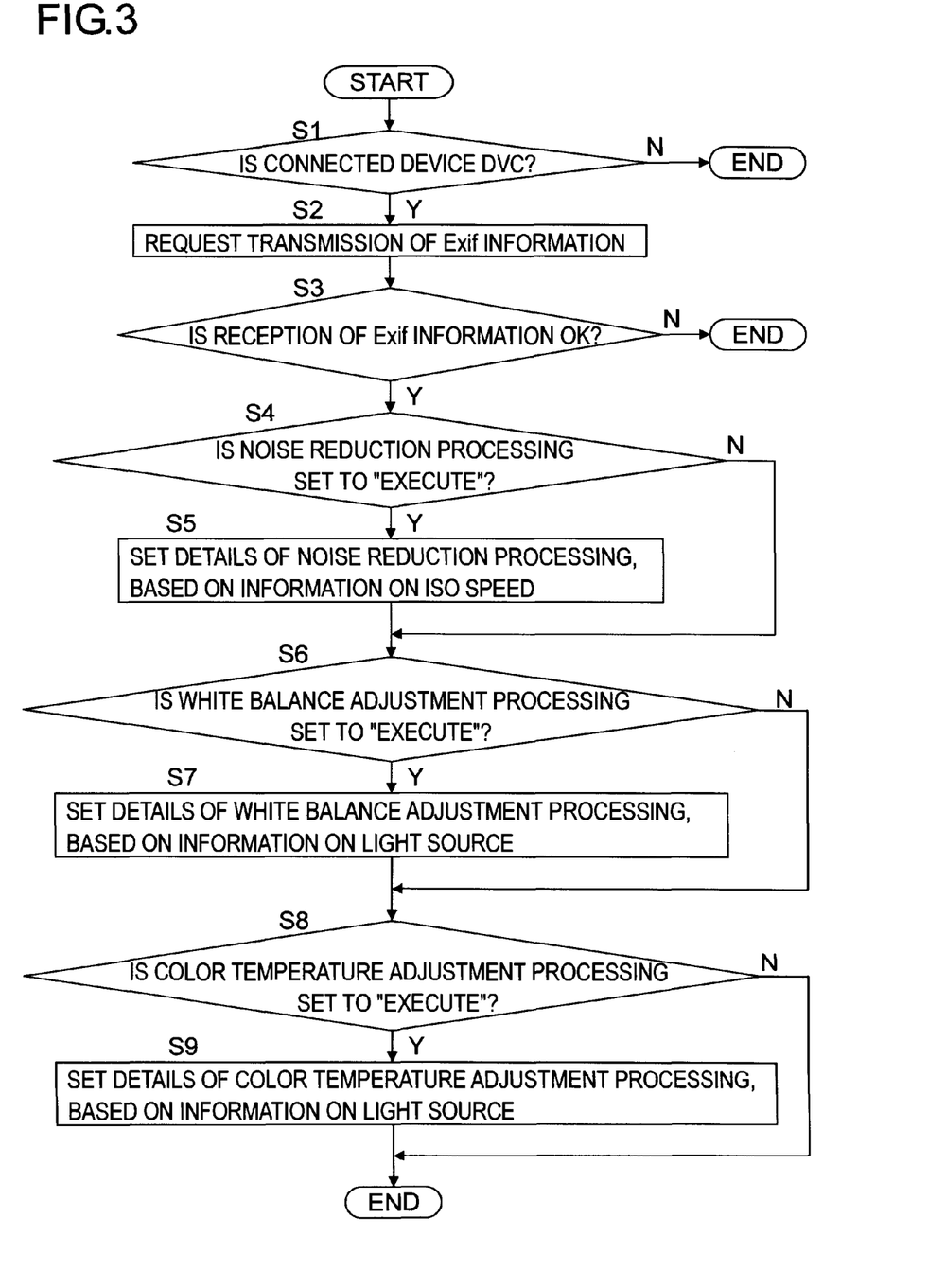
FIG. 3 is a flow chart illustrating the adjustment detail setting processing.

Next, the specific details of the adjustment detail setting processing are described with reference to the flow chart of FIG. 3.

When the input path for the image signal is switched to the input path including the HDMI terminal 41, the image display device 1 first determines, based on HDMI AV InfoFrame information (hereinafter, referred to as "HDMI-AV information") transmitted from an external device connected to the HDMI terminal 41, whether or not the external device is a DVC or not (Step S1). As a result, when it is determined that the external device is not a DVC (N in Step S1), the adjustment detail setting processing of this time is regarded as unnecessary, and the adjustment detail setting processing is ended.

On the other hand, when it is determined that the external device is a DVC (Y in Step S1), the image display device 1 requests the transmission of exchangeable image file format (Exif) information from the external device (Step S2). The request is made by using a consumer electronics control (CEC) function (using the CEC line) of the HDMI standard.

Figure 4:
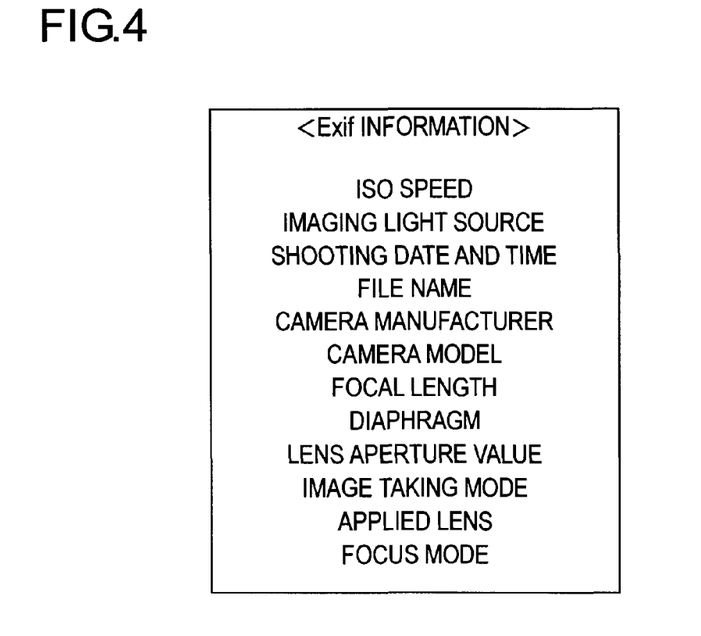
FIG. 4 is an explanatory diagram for illustrating exchangeable image file format (Exif) information.

The Exif information generally contains various kinds of information, for example, as illustrated in FIG. 4. Here, information on "ISO speed" is information indicating a value of sensitivity in image taking. As is well known, noise contained in the image information is more likely to increase as the value becomes larger. Further, information on "imaging light source" contained in the Exif information is information indicating the type of the light source used for image taking (for example, the user determines and sets the type of the light source used in image taking), which may be described as "daylight" or "white fluorescent lamp".

In addition, the Exif information described herein further contains information such as "shooting date and time", "file name", "camera manufacturer", "camera model", "focal length", "diaphragm", "lens aperture value", "image taking mode", "applied lens", and "focus mode". It should be noted that the image display device 1 may request, other than the Exif information, information indicating whether the image information is of a moving image or of a still image, or information indicating whether correction is made for the white balance on the DVC side, from the external device, by using CEC.

In a case where no Exif information is received from the external device even when a request is made for asking the transmission of the Exif information (for example, in a case where the Exif information is not received within a predetermined time limit) (N in Step S3), the image display device 1 assumes that the adjustment detail setting processing at this time is inexecutable, and ends the adjustment detail setting processing.

On the other hand, when the Exif information is received from the external device (Y in Step S3), the image display device 1 determines whether the noise reduction processing is set to "execute" on the menu screen (Step S4). As a result, when the noise reduction processing is set to "execute" (Y in Step S4), the image display device 1 sets details of the noise reduction processing, based on the information on the "ISO speed" contained in the Exif information received from the external device.

More specifically, the image display device 1 sets the noise reduction amount to a larger value as the value of the ISO speed becomes larger. It should be noted that it is well known that noise contained in the image information is more likely to increase as the value of the ISO speed becomes larger. In view of this, when the noise reduction amount is set as described above, the noise reduction processing may be implemented to a degree that is commensurate with the amount of noise.

Other than the embodiment described above, the execution/unexecution of the noise reduction processing may be switched based on, for example, whether or not the value of the ISO speed exceeds a predetermined threshold value. With this configuration, the noise reduction processing may be executed only when a relatively large amount of noise is assumed to be contained (when the value of the ISO speed is large). As a result, the frequency at which the noise reduction processing is executed may be suppressed to minimum.

Alternatively, based on HDMI-AV information and the like received from the external device, it may be determined whether the image signal received from the external device is of a moving image or of a still image, and the noise reduction amount may be set or the execution/unexecution of the noise reduction processing may be switched based also on the result of the determination. In general, a taken image likely to contain more noise when the image is a moving image as compared with the case where the image is a still image.

Figure 5:
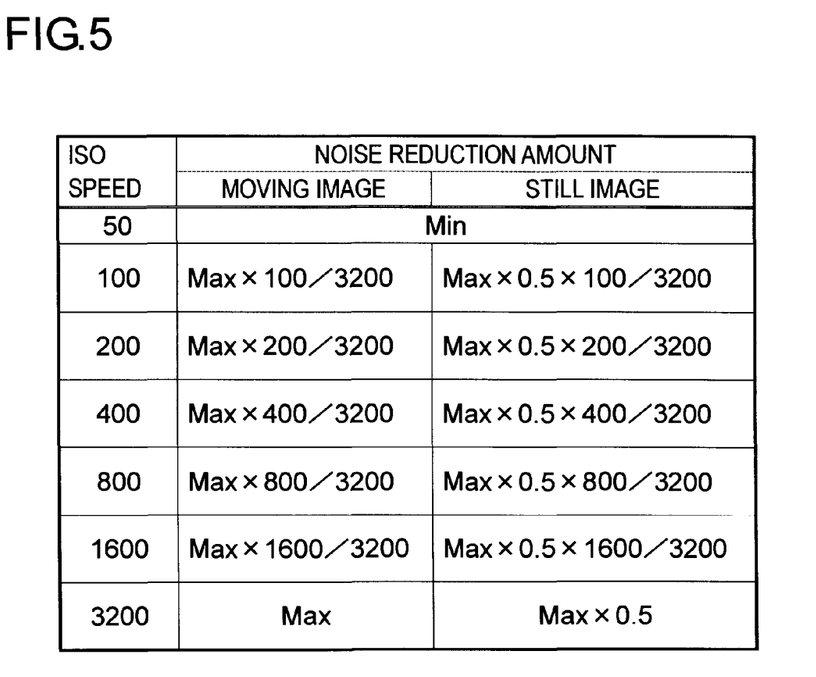
FIG. 5 is an explanatory diagram for illustrating noise reduction processing.

In the case where the noise reduction amount is set based on whether or not the image signal is of a still image or of a moving image, the noise reduction amount is set, for example, as illustrated in FIG. 5. That is, the noise reduction amount is set to a larger value as the value of the ISO speed becomes larger, while the noise reduction amount is set to a larger value when the image is a moving image as compared with the case where the image is a still image. It should be noted that, "Min" illustrated in FIG. 5 represents a minimum value that may be set to the noise reduction amount in the image display device 1, while "Max" similarly represents a maximum value.

Then, when the processing in Step S5 is completed, the image display device 1 next determines whether or not the white balance adjustment processing is set to "execute" on the menu screen (Step S6).

In a case where the noise reduction processing is set to "unexecute" on the menu screen (N in Step S4), the noise reduction processing associated with sensitivity information is set to be unexecuted, and the process of Step S6 is executed.

Further, in the case where the process of Step S5 is inexecutable (for example, in a case where the Exif information does not contain ISO speed information), the process of Step S5 is omitted, and the process of Step S6 is executed.

In the process of Step S6, when it is determined that "execute" is set (Y in Step S6), the image display device 1 sets details of the white balance adjustment processing, based on information on "imaging light source" contained in the Exif information received from the external device (Step S7). For example, based on a database related to the white balance adjustment (in which a correction amount in the white balance adjustment is determined for each type of the light source) which is registered in the image display device 1 in advance, a correction amount corresponding to the information on the imaging light source is determined, and the value is set as the correction amount (degree of correction) in the white balance adjustment processing. In this manner, white balance adjustment suited for the imaging light source may be appropriately attained.

On the other hand, on the menu screen, in a case where "viewing light source is reflected" is set for the white balance adjustment processing, the image display device 1 sets details of the white balance adjustment processing based on the information on the viewing light source, in stead of executing the process described above. More specifically, the image display device 1 measures the brightness of each color via the RGB sensor 64, and estimates, based on the measurement result, the type of the viewing light source.

Then, for example, based on the database related to the white balance adjustment, the correction amount associated with the estimated viewing light source is identified, and the value is set as a correction amount (degree of correction) in the white balance adjustment processing. It should be noted that, in stead of employing the embodiment described above, details of the white balance adjustment processing may be set so that the white balance inversely proportional to the information on the viewing light source may be attained.

When the setting is made as described above, appropriate white balance adjustment suited for the viewing environment may be attained. It should be noted that details of the white balance adjustment may be automatically set based on the information on the viewing light source, in the case where details of the white balance adjustment processing may not be set based on the information on the imaging light source (for example, in a case where the Exif information does not contain information on the imaging light source).

Then, when the process of Step S7 is completed, the image display device 1 next determines whether or not the color temperature adjustment processing is set to "execute" on the menu screen (Step S8).

In a case where the white balance adjustment processing is set to "unexecute" on the menu screen (N in Step S6), the white balance adjustment processing associated with light source information is set to be unexecuted, and the process of Step S8 is executed. Further, the process of Step S7 may be omitted in a case where the white balance adjustment processing is already executed on the external device side, and the process of Step S8 may be executed.

In the process of Step S8, when it is determined that "execute" is set (Y in Step S8), the image display device 1 sets details of the color temperature adjustment processing, based on information on "imaging light source" contained in the Exif information received from the external device (Step S9). For example, based on a database related to the color temperature adjustment (in which a color temperature is determined for each type of the light source) which is registered in the image display device 1 in advance, a color temperature corresponding to the information on the imaging light source is determined, and the value is set as a target value for the color temperature adjustment processing.

In this manner, color temperature adjustment suited for the imaging light source may be appropriately attained. Further, when the target value is set as described above, the correction amount (degree of correction) in the color temperature adjustment may be regarded as being set based on the information on the imaging light source.

Figure 6:
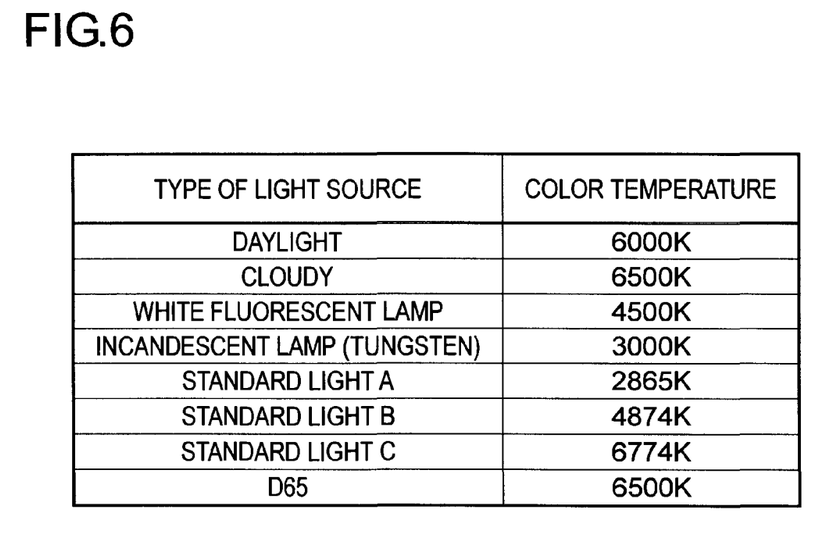
FIG. 6 is an explanatory diagram for illustrating color temperature adjustment processing.

It should be noted that the database related to the color temperature adjustment may be configured as, for example, a table information (look-up table (LUT)) illustrated in FIG. 6. The database illustrates that, for example, when the light source is "daylight", the color temperature corresponding to the light source is 6,000 K.

On the other hand, on the menu screen, in a case where "viewing light source is reflected" is set for the color temperature adjustment processing, the image display device 1 sets details of the color temperature adjustment processing based also on the information on the viewing light source, in stead of executing the process described above. More specifically, the image display device 1 measures the brightness of each color via the RGB sensor 64, and estimates, based on the measurement result, the type of the viewing light source.

Then, an average value of the color temperature corresponding to the imaging light source and the color temperature corresponding to the viewing light source is calculated, and the calculated value is set as a target value for the color temperature adjustment processing. For example, when the information on the imaging light source is "incandescent lamp" (corresponding target value is "3,000 K") and the information on the viewing light source is "daylight" (corresponding target value is 6,000 K), the following value is calculated.

$$(3,000 \text{ K} + 6,000 \text{ K})/2 = 4,500 \text{ K}$$

Accordingly, "4,500 K" is set as a target value for the color temperature adjustment processing.

In this manner, appropriate color temperature adjustment is attained with consideration given to a balance between the imaging environment and the viewing environment. It should be noted that, when the target value is set as described above, the correction amount (degree of correction) in the color temperature adjustment may be regarded as being set based on the information on the imaging light source and on the information on the viewing light source (detection result in the RGB sensor 64). Further, in the case where the Exif information does not contain light source information, details of the color temperature adjustment may be automatically set based only on the information on the viewing light source.

When the process of Step S9 is completed, the image display device 1 ends the series of adjustment detail setting processing. It should be noted that, in the case where the color temperature adjustment processing associated with the light source information is set to "unexecute" (N in Step S8), the color temperature adjustment processing associated with the light source information is set to be unexecuted, and the series of the adjustment detail setting processing is ended. After the adjustment detail setting processing is ended, the image display device 1 displays an image signal transmitted from the external device on the panel 60, until the input path for the image signal is switched to any path other than the input path including the HDMI terminal 41.

At this time, the image display device 1 executes, according to the settings in the adjustment detail setting processing, the noise reduction processing associated with the sensitivity information, and the white balance adjustment processing and the color temperature adjustment processing associated with the light source information. It should be noted that, in the image display device 1, the Exif information transmitted from the external device may be continuously monitored, and in a case where the information on the ISO speed and the information on the imaging light source are changed, or in the case where the type of image information (whether the image is a moving image or a still image) is changed, the adjustment detail setting processing may be executed in each of the cases.

As described above, the image display device 1 is configured to display image information acquired via any one of the plurality of input paths. Further, the image display device 1 has a function of acquiring image information and the Exif information associated with the image information by an HDMI communication from the external device, a function of executing image quality adjustment processing in relation to the display of the image information, and a function of setting details of the image quality adjustment processing (such as noise reduction processing, white balance adjustment processing, and color temperature adjustment processing) based on the Exif information thus acquired.

Therefore, according to the image display device 1, when displaying image information, image quality adjustment processing is executed based on the Exif information on the image information. Accordingly, as compared with a case where the Exif information is not used, details of the image quality adjustment processing may easily be set automatically in an appropriate manner.

It should be noted that, in the process of Step S5, the degree of correction (noise reduction amount) in the noise reduction processing is set based on the information on the ISO speed contained in the Exif information. Further, in the process of Step S7, the degree of correction in the white balance adjustment processing is set based on the information on the imaging light source contained in the Exif information or on the information on the viewing light source (detection result in the RGB sensor 64). Still further, in the process of step S9, the degree of correction in the color temperature adjustment processing is set based on the information on the imaging light source contained in the Exif information or on the information on the imaging light source and the information on the viewing light source (detection result in the RGB sensor 64).

A description has now been given on the embodiment of the present invention. However, the present invention is not limited to what has been described above. Further, the embodiment of the present invention may be modified in various ways without departing from the spirit of the present invention.

It should be noted that an object of the present invention is to provide an image display device in which details of image quality adjustment processing may easily be set automatically in an appropriate manner.

In order to achieve the above-mentioned object, according to the present invention, there is provided an image display device for displaying acquired image information including: an information acquisition section for acquiring image information and Exif information associated with the image information by an HDMI communication from an external device; an adjustment section for executing image quality adjustment processing in relation to display of the image information; and a setting section for setting details of the image quality adjustment processing, based on the Exif information.

With this configuration, when displaying image information, the image quality adjustment processing is executed based on the Exif information on the image information. Accordingly, as compared with the case where the Exif information is not used, details of the image quality adjustment processing may easily be set automatically in an appropriate manner. It should be noted that the image quality adjustment processing may be exemplified as, for example, noise reduction processing, white balance adjustment processing, and the color temperature adjustment processing.

Further, in the above-mentioned configuration, the adjustment section may execute, as the image quality adjustment processing, noise reduction processing for reducing noise by making a correction to the image information, and the setting section may set a degree of the correction in the noise reduction processing, based on information on ISO speed contained in the Exif information.

With this configuration, in a case where a relatively larger amount of noise is assumed to be contained in the image information (case where the ISO speed is relatively large), the degree of the correction in the noise reduction processing may be increased. Accordingly, the noise reduction processing may easily be executed in an appropriate manner.

Further, in the above-mentioned configuration, the setting section may determine whether the image information is of a moving image or of a still image, and, based also on a result of the determination, may set the degree of the correction in the noise reduction processing.

With this configuration, in a case where the image information is of a moving image (case where the image information is assumed to contain more noise as compared with the case where the image information is of a still image), the degree of the correction in the noise reduction processing may be increased. Accordingly, the noise reduction processing may easily be executed in a more appropriate manner.

Further, in the above-mentioned configuration, the adjustment section may execute, as the image quality adjustment processing, white balance adjustment processing in displaying the image information, and the setting section may set a degree of correction in the white balance adjustment processing, based on information on an imaging light source contained in the Exif information.

Further, in the above-mentioned configuration, the image display device may include a detection section for detecting ambient brightness of the image display device for each of a plurality of colors. The adjustment section may execute, as the image quality adjustment processing, white balance adjustment processing in displaying the image information. The setting section may set a degree of correction in the white balance adjustment processing, based on a result of the detection in the detection section. With those configurations, the white balance adjustment processing may easily be executed in a more appropriate manner.

Further, in the above-mentioned configuration, the image display device may include a detection section for detecting ambient brightness of the image display device for each of a plurality of colors. The adjustment section may execute color temperature adjustment processing in displaying the image information. The setting section may set a degree of correction in the color temperature adjustment processing, based on information on an imaging light source contained in the Exif information and a result of the detection in the detection section. With those configurations, the adjustment processing may easily be executed in a more appropriate manner.

Further, in the above-mentioned configuration, the adjustment section may execute, as the image quality adjustment processing, noise reduction processing for reducing noise by making a correction to the image information, and whether or not to execute the noise reduction processing may be determined depending on whether or not a value of ISO speed contained in the Exif information exceeds a predetermined threshold value.

Further, in the above-mentioned configuration, the setting section may increase the degree of the correction in the noise reduction processing as a value of the ISO speed contained in the Exif information increases. Further, in the above-mentioned configuration, the setting section may set the degree of the correction in the noise reduction processing to a larger value when the image information is of a moving image, as compared with a case where the image information is of a still image.

Further, according to another embodiment of the present invention, there is provided an image display device for displaying acquired image information including: an information acquisition section for acquiring image information and information on ISO speed associated with the image information by communication from an external device; an adjustment section for executing image quality adjustment processing in relation to display of the image information; and a setting section for setting details of the image quality adjustment processing, based on information on ISO speed.

Further, according to a further embodiment of the present invention, there is provided an image display device for displaying acquired image information including: an information acquisition section for acquiring image information and information on an imaging light source associated with the image information by communication from an external device; an adjustment section for executing image quality adjustment processing in relation to display of the image information; and a setting section for setting details of the image quality adjustment processing, based on the information on an imaging light source.

Further, according to a still further embodiment of the present invention, there is provided an image display device for displaying acquired image information including: an information acquisition section for acquiring image information and Exif information associated with the image information by an HDMI communication from an external device; a detection section for detecting ambient brightness of the image display device for each of a plurality of colors; an adjustment section for executing image quality adjustment processing in relation to display of the image information; and a setting section for setting details of the image quality adjustment processing, in which: the adjustment section executes, as the image quality adjustment processing, noise reduction processing for reducing noise by making a correction to the image information, white balance adjustment processing in displaying the image information, and color temperature adjustment processing in displaying the image information; and the setting section sets a degree of the correction in the noise reduction processing, based on information on ISO speed contained in the Exif information and on whether the image information is of a moving image or of a still image, sets a degree of correction in the white balance adjustment processing, based on information on an imaging light source contained in the Exif information, and sets a degree of correction in the color temperature adjustment processing, based on the information on the imaging light source contained in the Exif information and detection result in the detection section.

Further, according to a yet still further embodiment of the present invention, there is provided an image display device for displaying acquired image information including: an information acquisition section for acquiring image information and Exif information associated with the image information by an HDMI communication from an external device; a detection section for detecting ambient brightness of the image display device for each of a plurality of colors; an adjustment section for executing image quality adjustment processing in relation to display of the image information; and a setting section for setting details of the image quality adjustment processing, in which: the adjustment section executes, as the image quality adjustment processing, noise reduction processing for reducing noise by making a correction to the image information, white balance adjustment processing in displaying the image information, and color temperature adjustment processing in displaying the image information; and the setting section sets a degree of the correction in the noise reduction processing, based on information on ISO speed contained in the Exif information and on whether the image information is of a moving image or of a still image, sets a degree of correction in the white balance adjustment processing, based on a result of the detection in the detection section, and sets a degree of correction in the color temperature adjustment processing, based on the information on the imaging light source contained in the Exif information and detection result in the detection section.

As described above, according to the image display device of the present invention, when displaying image information, image quality adjustment processing is executed based on the Exif information on the image information. Accordingly, as compared with a case where the Exif information is not used, details of the image quality adjustment processing may easily be set automatically in as appropriate manner as possible.

What is claimed is:

1. An image display device for displaying acquired image information, comprising:
    an information acquisition section for acquiring image information and exchangeable image file format (Exif) information associated with the image information by a high-definition multimedia interface (HDMI) communication from an external device;
    an adjustment section for executing image quality adjustment processing in relation to display of the image information;
    a setting section for setting details of the image quality adjustment processing, based on the Exif information; and
    a detection section for detecting ambient brightness of the image display device for each of a plurality of colors, wherein:
    the adjustment section executes, as the image quality adjustment processing, noise reduction processing for reducing noise by making a correction to the image information;
    the setting section sets a degree of the correction in the noise reduction processing, based on information on ISO speed contained in the Exif information;
    the adjustment section executes, as the image quality adjustment processing, white balance adjustment processing in displaying the image information; and
    the setting section sets a degree of correction in the white balance adjustment processing, based on a result of the detection in the detection section.

2. An image display device for displaying acquired image information, comprising:
    an information acquisition section for acquiring image information and exchangeable image file format (Exif) information associated with the image information by a high-definition multimedia interface (HDMI) communication from an external device;
    an adjustment section for executing image quality adjustment processing in relation to display of the image information;

a setting section for setting details of the image quality adjustment processing, based on the Exif information; and a detection section for detecting ambient brightness of the image display device for each of a plurality of colors, wherein:

the adjustment section executes, as the image quality adjustment processing, noise reduction processing for reducing noise by making a correction to the image information;

the setting section sets a degree of the correction in the noise reduction processing, based on information on ISO speed contained in the Exif information;

the adjustment section executes color temperature adjustment processing in displaying the image information; and the setting section sets a degree of correction in the color temperature adjustment processing, based on information on an imaging light source contained in the Exif information and a result of the detection in the detection section.

* * * * *